June 16, 1931. C. F. BECKWITH 1,810,067
VALVE
Filed March 6, 1929
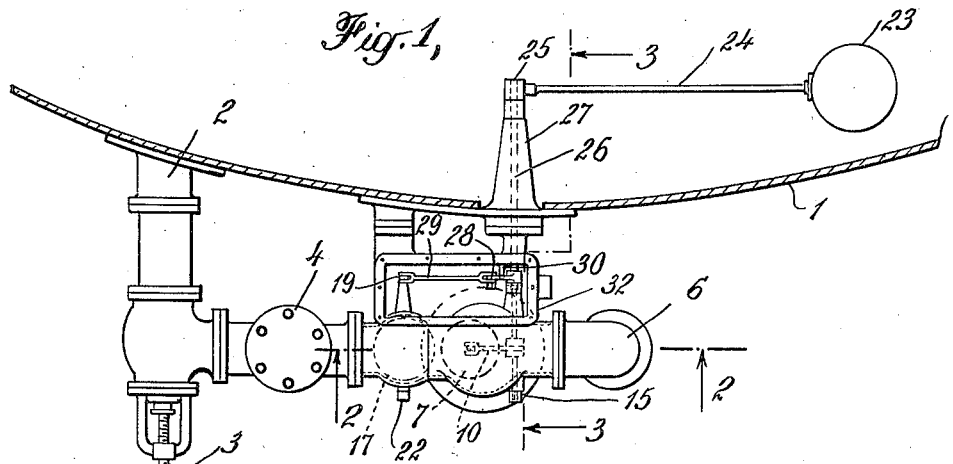
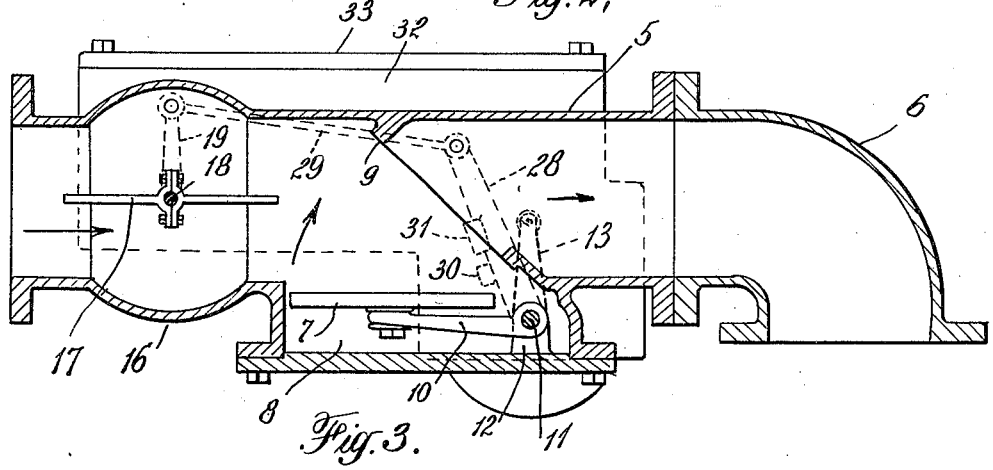
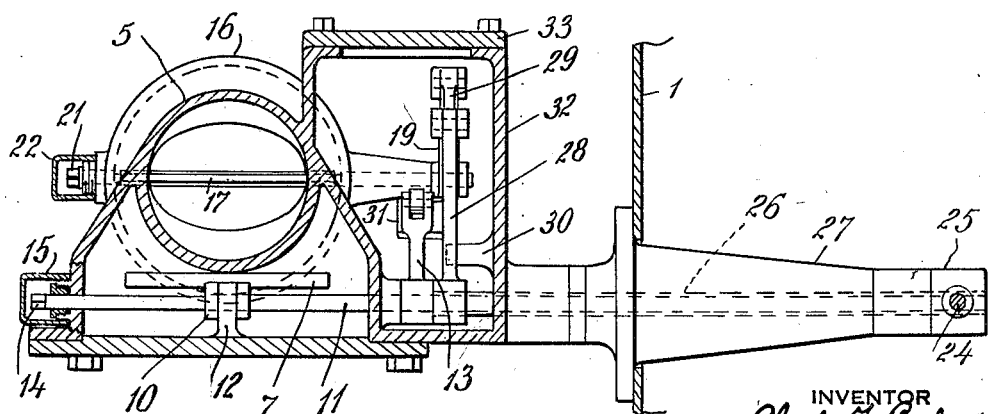
INVENTOR
Charles F. Beckwith
BY
his ATTORNEYS Patented June 16, 1931

1,810,067

UNITED STATES PATENT OFFICE

CHARLES F. BECKWITH, OF NEW YORK, N. Y., ASSIGNOR, BY DIRECT AND MESNE ASSIGNMENTS, TO AQUA SYSTEMS INCORPORATED, OF NEW YORK, N. Y., A CORPORATION OF NEW YORK

VALVE

Application filed March 6, 1929. Serial No. 344,720.

This invention relates to valves intended for use in places where relatively large volumes of fluid are flowing at high speeds, and has been developed particularly for use in hydraulic oil storage and delivery systems employing large storage tanks situated above ground. In U. S. Patents, Nos. 1,582,855 and 1,582,857 hydraulic oil storage and delivery systems are disclosed provided with oil and water discharge valves situated in the oil and water discharge pipes respectively. These valves are pivoted at one side of their discharge pipes and lie normally out of the path of flow. When the water and oil lever reaches a predetermined point close to the entrance of a given discharge pipe, a float designed to sink in oil but float in water, acts automatically to swing the valve into the path of flow of the discharging liquid, whereupon the pressure of the liquid itself quickly seats the valve and keeps it seated. These valves have given excellent service in actual practice and are well adapted for use in systems where the volume of liquid discharged is small and the speed of flow relatively low. Where, however, these conditions do not obtain, as in systems employing large storage tanks from and into which large quantities of liquid are passed at high rates of flow, the wear and tear upon the valves becomes excessive necessitating frequent repairs. This wear and tear is due primarily to the great force with which the valves are flung against their seats by the on-rushing liquid.

It is the object of the present invention so to construct a valve of this character that it shall be seated gently but no less swiftly. I have attained this object by providing means for checking the flow in advance of the operation of the valve, as by mounting an auxiliary valve adjacent the main valve, either before or behind, and partly closing this valve ahead of the main valve. I preferably employ a balanced auxiliary valve of the butterfly type which, when extending across the passageway and normal to the path of flow, does not completely arrest the flow but permits the passage of sufficient liquid effectively to seat the main valve but with greatly diminished force. This balanced valve normally lies parallel to the path of flow. When the float, or other mechanism for closing the main valve, starts moving toward valve-closing position, the auxiliary valve, through suitable connections, starts to move across the passageway, thus progressively checking the flow, and by the time the main valve is swung outward into the moving liquid, that liquid although still moving with sufficient speed to seat the valve, is not moving so fast as to fling it upon its seat with damaging force. I also place the valves and their mechanism external of the tank where they are easily accessible for adjustment, repairs and cleaning.

In the accompanying drawings I have illustrated a preferred embodiment of my invention as applied to the storage tank of a hydraulic oil storage and delivery system. In these drawings, Figure 1 is a horizontal section through the vertical side wall of a storage tank showing my valve and its operating mechanism in plan; Figure 2 is a vertical section on an enlarged scale taken along line 2—2 of Figure 1, and Figure 3 is a transverse section, also on an enlarged scale, taken along line 3—3 of Figure 1.

In these drawings 1 represents the side wall of an oil storage tank, and 2 is a discharge pipe communicating therewith. This discharge pipe is provided with a manually controlled valve 3, a strainer 4 and the automatic control valves of the present invention mounted within a housing 5. Beyond the housing 5 is an elbow 6 which directs the liquid flowing through the discharge pipe to the sewer, if it is water, or to a waiting receptacle or point of use, if it is oil. If the discharge pipe 2 is a water discharge pipe it will be situated adjacent the bottom of the tank, whereas, if it is an oil discharge pipe, it will be situated adjacent the top of the tank. The operation of the control valve will be the same in either instance, with this one difference:—in controlling the discharge of water, the valve is closed when the oil and water level reaches a predetermined low point, whereas in discharging oil the valve is closed when the oil and water level is at a predetermined high point. The drawings illustrate the valve of the present invention adapted for use in a water discharge pipe, but it could be used equally well in an oil discharge pipe by a reversal of the float, as will be explained presently.

The main valve 7 is situated within the housing 5 and normally lies in the horizontal position illustrated within a well 8 and out of the path of flow. The valve seat 9 extends diagonally across the path of flow. The valve is moved upward against this seat partly by the mechanism to be described and partly by the pressure of the liquid itself. The valve proper consists of a circular disc which is mounted upon an arm 10 secured to a rotatable valve stem 11. This valve stem is journalled at its middle within a boss 12, and extends outward through the housing. A normally vertical arm 13 is fixed to the stem between the housing and the tank, and the outer end of the stem, after passing through a loose stuffing box, terminates in a squared portion 14 normally covered by means of a threaded cap 15.

Somewhat in advance of the valve 7, the housing 5 is provided with a curved or bulbous enlargement 16 to accommodate an auxiliary balanced valve 17 fixed for horizontal rotation upon a stem 18. This valve normally lies in the position illustrated in Figure 2 parallel with the path of flow, and interfering but slightly with the passage of liquid through the housing. As it is turned from a horizontal to a vertical position the flow is progressively checked, but even when the valve lies within the enlargement 16 it does not completely close the passageway as its extreme width is less than the diameter of the section 16 and some liquid is thus permitted to pass. The ends of the stem 18 are journalled within the side walls of the housing, the inner end, beyond the housing, being secured to an arm 19 and the outer end, after passing through a loose stuffing box, terminating in a squared end 21 enclosed within a threaded cap 22.

Both the main valve 7 and the auxiliary valve 17 are controlled and operated by a float 23 situated within the tank and designed to float in water and sink in oil. The stem 24 of this float is secured to a collar 25 on the end of a sleeve 26 enclosing the valve stem 11 and journalled within an inwardly extending tapered boss 27. The outer end of this sleeve 26 is fixed to an arm 28 which is connected to the arm 19 of the valve 17 by means of a link 29 so that movement of the float 23 is imparted to the valve 17. Extending outward from the side of the arm 28 is a lug 31 designed to contact with the end of the arm 13 of the valve 7 so that downward movement of the float 23 will cause the main valve 7 to swing upward and into the path of flow. As clearly illustrated in Figure 2, when the valve 17 is horizontal the arm 28 is angularly displaced from the arm 13 so that the former must swing through a considerable angle before the lug 31 acts upon the arm 13 to close the main valve. This angle is substantially the angle through which the valve 17 must swing before entering the enlargement 16. Further clockwise movement of the arm 28, although changing the angular position of the auxiliary valve 17, does not change its effect upon the system, because as long as this valve lies wholly within the bulbous enlargement 16 it exerts its maximum and substantially unvarying check upon the flow.

The arms 13, 19 and 28, with the connecting link 29, are mounted within an auxiliary housing 32 adjacent the valve housing 5. This housing is provided with a removable cover plate 33 permitting access to the interior of the housing for adjustment and repairs.

The valves are illustrated as wide open and the float in its uppermost position. Downward movement of the float will close the valves. Further upward movement is prevented by means of a stop lug 30 extending inward from the inner side wall of the housing 32 and acting to limit counter-clockwise movement of the arm 28.

The apparatus operates as follows: Let us assume that the storage tank is filled with water and is to be filled with oil. The valve 3 is opened, whereupon the water within the tank flows out through the discharge pipe 2, past the open valves 17 and 7 and through the elbow 6 to the sewer. As the float 23 is then completely surrounded by water, it is in its uppermost position and the valves are as illustrated in Figure 2. Meanwhile oil is introduced. The object of the automatic valve control is to close the valve 7 before the oil lying upon the lowering surface of the water reaches the opening of the discharge pipe 2 so that no oil can pass through this pipe and to waste. Hence, when the oil and water level reaches the float 23, which float is situated a safe distance above the entrance to the pipe 2, the float moves down with the lowering water level. The moment it starts to move, the valve 17, through the connecting linkwork already described, begins to swing across the path of flow. As this valve is balanced its movements are relatively unaffected by the flow of water. As the float continues to sink, the arm 28, with its lug 31, approaches nearer and nearer the arm 13 until at last contact is made and the valve 7 moves upward into the path of flow. Were it not for the fact that the valve 17 had meanwhile entered the enlargement 16 and substantially checked the force of the on-rushing water, the main valve 7 would be instantly picked up and hurled with considerable force upon its seat. As it is, however, the flow of water past the valve 17, although sufficient to cause the valve 7 to seat quickly, is insufficient to cause any damage.

When the main valve 7 is closed further discharge of water is impossible and the tank is ready to deliver oil. Although it would be possible to pass the displacement water back through the pipe 2 as in the systems of the two Peter patents referred to in the opening paragraph of this specification, the valve 17 would interfere with free flow until the water level had risen sufficiently to open that valve. Consequently, I preferably introduce the displacement water through another pipe, not illustrated. Before the displacement water is introduced the valve 3 is closed. When the water level rises above the float the valve 7 is free to open and as the tank pressure has been removed by the closing of valve 3 it falls by gravity into horizontal position and the pipe 2 empties itself.

If the valve illustrated were employed in connection with an oil discharge pipe, it would be necessary to reverse the position of the float through 180° so that the valves would be operated by a rise rather than a fall in the water level, and the float would have to be situated below instead of above the entrance to the discharge pipe 2; otherwise the principles involved are precisely the same, and the operation need not be repeated.

It will be observed that all parts of the mechanism with the exception of the float are located externally of the tank and are thus easily accessible for repairs and adjustment. If desired the float too can be placed in an external chamber communicating with the tank through a valve controlled passageway. Thus by closing the valve to the tank the float is made readily available for inspection and repair even while the tank is full. But whether such an external chamber is used or not the float is effectively within the tank. Should either valve become jammed for any reason it is necessary only to remove the appropriate cap 15 or 22 and apply a wrench to the squared end of the valve stem. A loose packing at the outer ends of the valve stems is desirable, but the caps 15 and 22 are primarily relied upon to prevent leakage. A stuffing box may be employed around the sleeve 26.

By means of the valve mechanism of the present invention I have provided means for automatically seating a discharge control valve, utilizing the pressure of the discharging liquid without, however, injuring the valve or its seat in installations where the quantity of liquid handled is large and its rate of flow high. The auxiliary valve effectively checks the discharge flow so that although the liquid pressure is still relied upon to close the main valve and keep it seated, this pressure is reduced below the point at which it can damage the valve parts. When employed in connection with large storage tanks used in oil storage and delivery systems the valve housings are external of the tank and easily accessible for adjustment and repair.

I claim:

1. Valve mechanism comprising the combination of a housing, a main valve mounted at one side of the housing normally lying out of the path of flow, a valve seat lying across the path of flow, means for swinging the valve into the path of flow whereupon the pressure of the fluid seats it, an auxiliary valve for checking the flow and thus reducing the valve-closing pressure, and means for moving the auxiliary valve across the path of flow before the main valve is seated.

2. Valve mechanism comprising the combination of a housing, a main valve mounted at one side of the housing normally lying out of the path of flow, a valve seat lying across the path of flow, means for swinging the valve upon an axis disposed transversely to the path of flow into the path of flow whereupon the pressure of the fluid seats it, an auxiliary valve for checking the flow and thus reducing the valve-closing pressure, and means for moving the auxiliary valve to check but not shut off the flow before the main valve is seated, the auxiliary valve moving into its position of maximum retardation before the main valve is moved.

3. Valve mechanism comprising the combination of a housing, a main valve mounted at one side of the housing normally lying out of the path of flow upon a pivot transversely of the path of flow, a valve seat lying across the path of flow, a balanced auxiliary valve pivotally mounted in the housing in advance of the main valve and normally lying parallel to the path of flow, and means for turning the auxiliary valve to check the flow and reduce the valve-closing pressure and for thereafter swinging the main valve into the path of flow whereupon the pressure of the fluid seats it.

4. Valve mechanism comprising the combination of a housing, a main valve pivotally mounted at one side of the housing normally lying out of the path of flow, a valve seat lying across the path of flow, a balanced auxiliary butterfly valve pivotally mounted in the housing in advance of the main valve and normally lying parallel to the path of flow, a curved enlargement in the housing for receiving the butterfly valve, the diameter of the enlargement being greater than the width of the butterfly valve, and means for turning the butterfly valve to check the flow and reduce the valve-closing pressure and for thereafter swinging the main valve into the path of flow whereupon the pressure of the fluid seats it, the butterfly valve although continuing to turn during the seating of the main valve remaining across the curved enlargement and hence throughout in a position of maximum retardation.

5. Valve mechanism comprising the combination of a housing, a main valve pivotally mounted at one side of the housing normally lying out of the path of flow, a valve seat lying across the path of flow, an arm external of the housing for swinging the main valve into the path of flow whereupon it is seated by the pressure of the fluid, a balanced auxiliary valve pivotally mounted in the housing in advance of the main valve and normally lying parallel to the path of flow, and means for turning the auxiliary valve to check the flow and reduce the valve-closing pressure, said means acting upon the arm of the main valve to swing the latter into the path of flow after the auxiliary valve is turned.

6. In a hydraulic oil storage and delivery system, the combination of a tank, a discharge pipe communicating therewith, a valve pivoted at one side of the discharge pipe normally lying out of the path of flow, a float within the tank designed to float in water and sink in oil for automatically swinging the valve into the path of flow when the oil and water level has reached a predetermined point whereupon the pressure of the liquid closes the valve, and means operated by the float in advance of its action upon the valve for checking the flow and thus reducing the valve-closing pressure.

7. In a hydraulic oil storage and delivery system, the combination of a tank, a discharge pipe communicating therewith, a main valve pivoted at one side of the discharge pipe normally lying out of the path of flow, a float within the tank designed to float in water and sink in oil for automatically swinging the main valve into the path of flow when the oil and water level has reached a predetermined point whereupon the pressure of the liquid closes the main valve, a balanced auxiliary valve, and means operated by the float in advance of its action upon the main valve for moving the balanced auxiliary valve across the path of flow thereby reducing the valve-closing pressure.

8. In a hydraulic oil storage and delivery system, the combination of a tank, a discharge pipe communicating therewith, a valve pivoted at one side of the discharge pipe normally lying out of the path of flow, a main valve seat extending across the path of flow, an arm external of the discharge pipe connected with the main valve, a float within the tank designed to float in water and sink in oil, an arm connected with the float for contacting with the main valve arm to swing the latter into the path of flow when the oil and water level has reached a predetermined point, a balanced auxiliary valve in advance of the main valve normally lying parallel with the path of flow, and connections between the float arm and the auxiliary valve for swinging said valve across the path of flow, the relation of the parts being such that the auxiliary valve is moved effectively to check the flow before the float arm contacts with the valve arm.

9. In a hydraulic oil storage and delivery system, the combination of a tank, a discharge pipe communicating therewith, a valve housing in line with the discharge pipe and external of the tank, a valve pivoted at one side of the valve housing normally lying out of the path of flow, a float within the tank designed to float in water and sink in oil for automatically swinging the valve into the path of flow when the oil and water level has reached a predetermined point whereupon the pressure of the liquid closes the valve, and means operated by the float in advance of its action upon the valve for checking the flow and thus reducing the valve-closing pressure.

10. In a hydraulic oil storage and delivery system, the combination of a tank, a discharge pipe communicating therewith, a main valve pivoted at one side of the discharge pipe normally lying out of the path of flow, means for automatically swinging the valve into the path of flow when the oil and water level has reached a predetermined point whereupon the pressure of the liquid closes the valve, an auxiliary valve and means for automatically moving the auxiliary valve across the path of flow prior to the seating of the main valve thereby reducing the valve-closing pressure.

11. In a hydraulic oil storage and delivery system, the combination of a tank, a water discharge pipe communicating therewith adjacent the tank bottom, a main valve pivoted at one side of the discharge pipe normally lying out of the path of flow, a float within the tank designed to float in water and sink in oil for automatically swinging the valve into the path of flow when the oil and water level has reached a predetermined point, an auxiliary valve, means operated by the float in advance of its action on the main valve for moving the auxiliary valve across the path of flow thereby reducing the valve-closing pressure, and a manually controlled valve between the auxiliary valve and the tank.

In testimony whereof I affix my signature.

CHARLES F. BECKWITH.

CERTIFICATE OF CORRECTION.

Patent No. 1,810,067.  Granted June 16, 1931, to

CHARLES F. BECKWITH.

It is hereby certified that error appears in the printed specification of the above numbered patent requiring correction as follows: Page 1, line 14, for the word "lever" read level; page 3, line 75, claim 1, after the word "valve" insert the words upon an axis disposed transversely to the path of flow; same page, line 100, claim 3, after "pivot" insert the word disposed; and that the said Letters Patent should be read with these correction therein that the same may conform to the record of the case in the Patent Office.

Signed and sealed this 4th day of August, A. D. 1931.

(Seal)

Wm. A. Kinnan,
Acting Commissioner of Patents.